June 1, 1965
T. T. BROWN
3,187,206
ELECTROKINETIC APPARATUS
Filed May 9, 1958
2 Sheets-Sheet 2
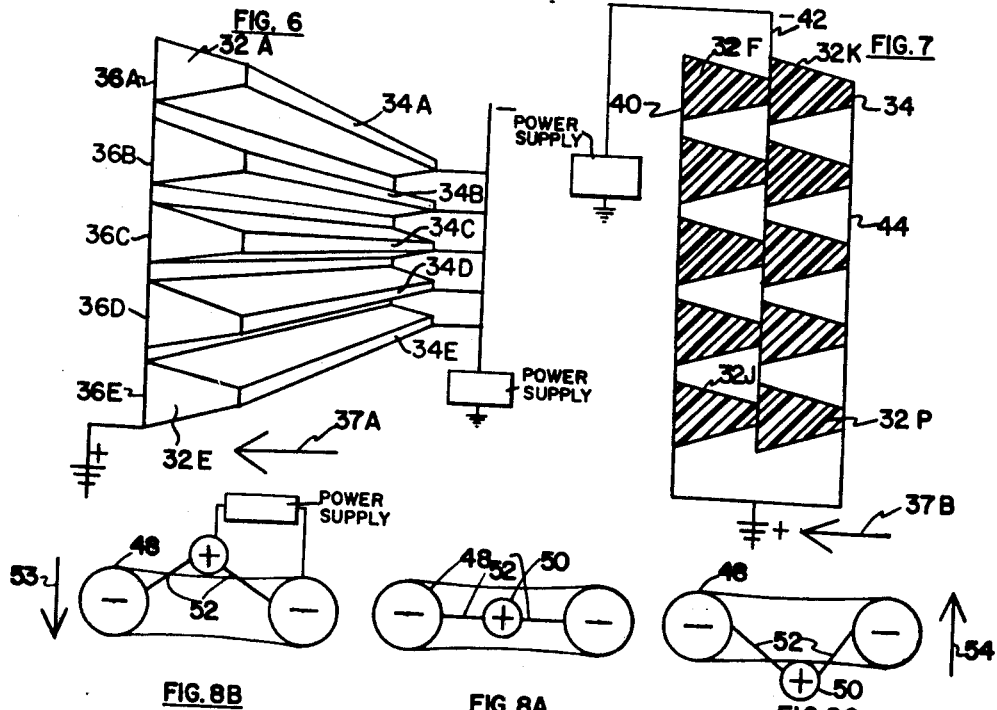

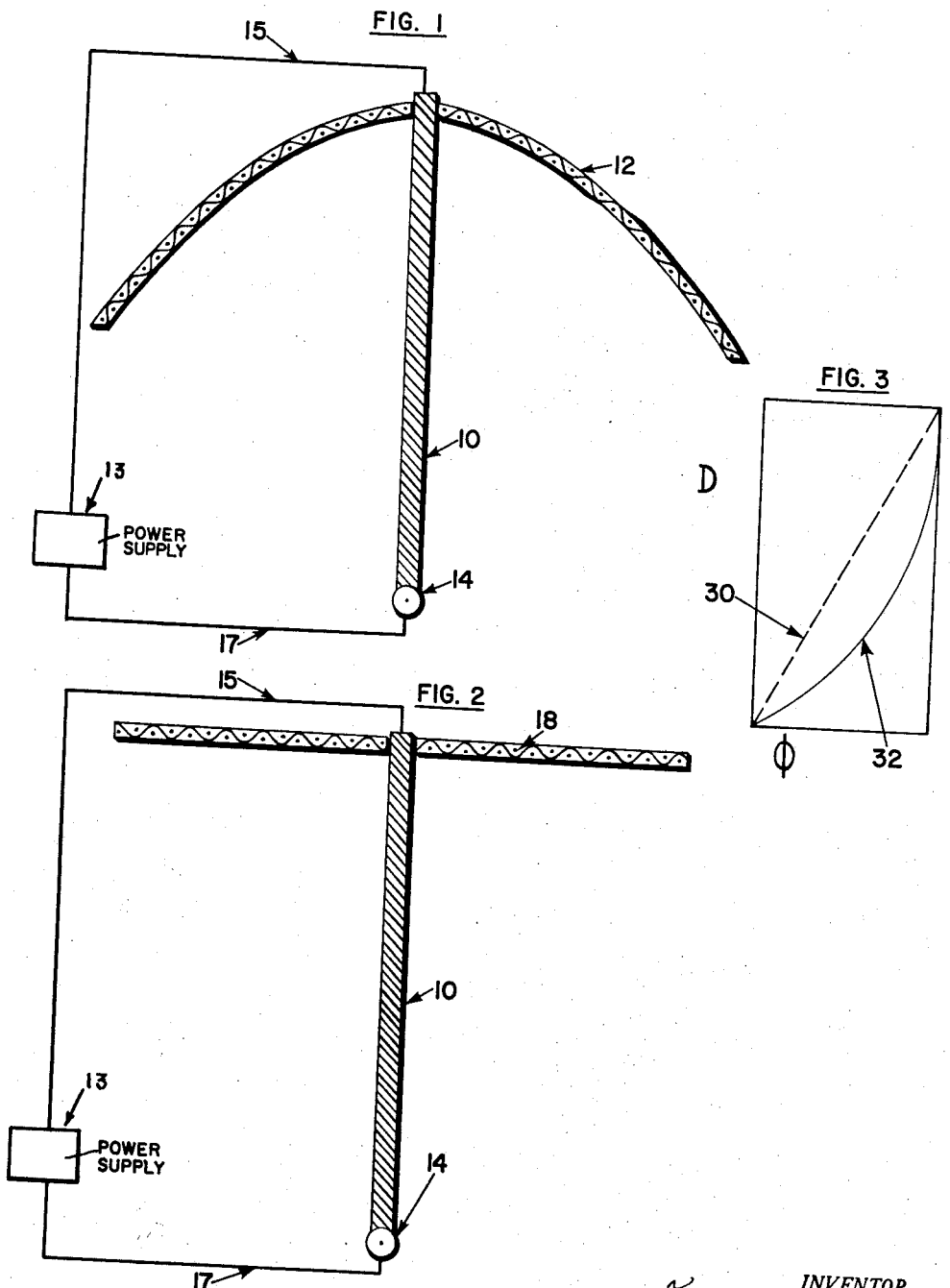

United States Patent Office 3,187,206
Patented June 1, 1965

3,187,206
ELECTROKINETIC APPARATUS
Thomas Townsend Brown, Walkertown, N.C., assignor, by mesne assignments, to Electrokinetics, Inc., a corporation of Pennsylvania
Filed May 9, 1958, Ser. No. 734,342
23 Claims. (Cl. 310—5)

This invention relates to an electrical device for producing thrust by the direct operation of electrical fields.

I have discovered that a shaped electrical field may be employed to propel a device relative to its surroundings in a manner which is both novel and useful. Mechanical forces are created which move the device continuously in one direction while the masses making up the environment move in the opposite direction.

When the device is operated in a dielectric fluid medium, such as air, the forces of reaction appear to be present in that medium as well as on all solid material bodies making up the physical environment.

In a vacuum, the reaction forces appear on the solid environmental bodies, such as the walls of the vacuum chamber. The propelling force however is not reduced to zero when all environmental bodies are removed beyond the apparent effective range of the electrical field.

By attaching a pair of electrodes to opposite ends of a dielectric member and connecting a source of high electrostatic potential to these electrodes, a force is produced in the direction of one electrode provided that electrode is of such configuration to cause the lines-of-force to converge steeply upon the other electrode. The force, therefore, is in a direction from the region of high flux density toward the region of low flux density, generally in the direction through the axis of the electrodes. The thrust produced by such a device is present if the electrostatic field gradient between the two electrodes is non-linear. This non-linearity of gradient may result from a difference in the configuration of the electrodes, from the electrical potential and/or polarity of adjacent bodies, from the shape of the dielectric member, from a gradient in the density, electric conductivity, electric permittivity and manetic permeability of the dielectric member or a combination of these factors.

A basic device for producing force by means of electrodes attached to a dielectric member is disclosed in my Patent 1,974,483. In one embodiment disclosed in my patent, an electrostatic motor comprises devices having a number of radially directed fins extended from one end of the dielectric body and a point electrode on the opposite end of the dielectric body. When this device is supported in a fluid medium, such as air, and a high electrostatic potential is applied between the two electrodes, a thrust is produced in the direction of the end to which the fins are attached.

Other electrostatic devices for producing thrust are disclosed and described in detail in my British Patent 300,-311, issued August 15, 1927.

Recent investigations in electrostatic propulsion have led to the discovery of improved devices for producing thrust by the use of electrical vectorial forces.

Accordingly, it is the primary object of this invention to provide an improved electrical device for producing thrust.

It is another object of this invention to provide a device for producing modulated thrust in response to varying electrical signals, which device produces a greater effect than the prior type devices mentioned above.

It is another object of this invention to provide a device which shapes or concentrates electrostatic flux to produce an improved thrust.

Broadly, the invention relates to shaping an electrical field to produce a force upon the device that shapes the field. The electrical field is shaped by the use of an electrode of special configuration whereby the electric lines-of-force are made to converge at a distance from the electrode. One illustrative embodiment of this invention which satisfies the above requirement is an arcuate surface or, alternatively, a system of wires, tubes or plates embedded in a dielectric surface and forming a directive array. One such highly-charged electrode acting within and upon an ambient of different electrical potential will move in response to the forces created by the shaping of the electrostatic field. If a smaller electrode is added at or near the focus of the field-shaping electrode and mechanically attached to that electrode, both electrodes as a system will move in a direction of the larger or field-shaping electrode. As is mentioned above, the field-shaping electrode alone, when charged with respect to its electric ambient, will move or possess a force in the direction of its apex. If another electrode carrying a different charge is added at or near the focal point of the field-shaping electrode, then the field becomes more concentrated, i.e. shaped to a greater degree and the resulting thrust is greater than that which exists when the field-shaping electrode alone is employed.

Briefly in accordance with aspects of this invention, an electrode is connected on each end of a dielectric member and one of the electrodes defines a large area flat or preferably arcuate surface which is curved in such a direction to produce, usually in co-operation with the other electrode, a shaped electrostatic field.

Advantageously, if the arcuate electrode is in the form of a parabola or hyperbola, the length of the dielectric member may be such that the other electrode is located in the region of the focus of the parabola or hyperbola, as the case may be. If the arcuate electrode is hemispherical, the other electrode is located near the center of the hemisphere.

In accordance with other aspects of this invention the dielectric member supporting the two electrodes may have electrical conductivity and/or dielectric constant which varies progressively between its ends so that the dielectric member contributes to the non-linearity of the field gradient and causes a greater thrust to be developed.

In accordance with still other aspects of this invention, an annular electrode member is secured to an electrode mounted in the region of the axis of the annular electrode. If the second electrode is located at the center of the annular electrode and the two electrodes are energized, such force is not detected. However, if the second or innermost electrode is displaced from the center of the annular electrode in the region of the axis of the annular electrode and the electrodes are energized, then thrust will be produced by the two electrodes. The annular electrode may either be a flat ring, a toroid, or a section of a cylinder.

In accordance with still other aspects of this invention, tapered dielectric members having electrodes secured to opposite edges thereof may be employed to produce a thrust in response to the application of potentials to these electrodes. The thrust produced by these tapered dielectric members may be further augmented by embedding massive particles, such as lead oxide, in the wedges, which particles are usually more concentrated near the points of the wedges.

Accordingly, it is a feature of this invention to provide an electrical device for producing thrust which includes a dielectric member and electrodes supported at each end of the dielectric member, one of which electrodes is located in the region of the focal point of the arc of the arcuate surface electrode.

It is another feature of this invention to provide a device for producing thrust having a dielectric member and a pair of electrodes secured to opposite ends of the dielectric rod or member, one of which electrodes defines a parabolic or hyperbolic surface, the other electrode being located in the region of the focus of said surface.

It is another feature of this invention to employ an insulating rod or member between two electrodes, which rod or member has a varying dielectric constant, said dielectric constant progressively increasing or decreasing along the length of the dielectric member.

It is still another feature of this invention to employ a rod or member connected between two electrodes across which an electrostatic potential is applied, which rod or member has a varying electrical conductivity, said conductivity progressively increasing or decreasing along the length of the dielectric member.

It is another feature of this invention to employ a single electrode having an arcuate surface and to connect a source of potential to the arcuate surface which is opposite in polarity to the potential of the masses comprising the environment of the arcuate surface.

It is still a further feature of this invention to employ an arcuate electrode as a device for producing thrust and to apply a varying electrical signal to the arcuate electrode.

It is still another feature of this invention to employ a wedge of dielectric material having electrodes on opposite ends thereof to produce a thrust in response to the application of electrical potentials.

It is still a further feature of this invention to employ a tapered dielectric material having massive particles embedded therein to produce a thrust in response to the application of potentials to the electrodes secured to the dielectric member.

It is still a further feature of this invention to employ an annular ring electrode and a second electrode secured to the annular electrode in the region of the axis of the annular electrode to produce a thrust in response to the application of electrical potentials thereto.

These and various other objects and features of this invention will be apparent from a consideration of the following description when read in connection with the accompanying drawing wherein:

FIGURE 1 is a view in elevation of one illustrative embodiment of this invention;

FIGURE 2 is a view in elevation, partly in section, of another illustrative embodiment of this invention;

FIGURE 3 is a graphical representation of the field gradient between the electrodes of one illustrative example of this invention in which distance from one electrode is plotted as the abscissa whereas flux density is plotted as the ordinate;

FIGURE 4 is a perspective view of another illustrative embodiment of this invention;

FIGURES 5 and 6 are perspective views of still another illustrative embodiment of this invention;

FIGURE 7 is an end view of another illustrative embodiment of this invention employing a pair of devices of the type disclosed in FIGURE 6, which devices are mounted and serially connected in a single array;

FIGURES 8A, 8B and 8C are views in elevation, partly in section, of still other illustrative embodiments of this invention.

Referring now to FIGURE 1, there is depicted an insulating member 10 having an arcuate electrode 12 mounted on one end thereof and a second electrode 14 mounted on the opposite end thereof. A source of direct current voltage 13 is connected to electrodes 12 and 14 through conductors 15 and 17, respectively. I have discovered that if two electrodes are mounted on opposite ends of a dielectric member, and a field emanates from these electrodes which produces a linear gradient through the dielectric member as shown by dotted line 30 of FIGURE 3, then no thrust is produced by the dielectric member. However, if the field is distorted to produce a non-linear gradient such as graphically represented by line 32 in FIGURE 3, then a thrust will be produced, which thrust will be related to the degree of non-linearity of the field gradient. One way to produce a gradient which varies non-linearly is to shape one of the electrodes in a form of an arcuate surface such as 12. However, numerous other ways to influence the field gradient will be disclosed below. Electrode 14 represents a substantial mass and it has been found that best results are obtained if the surface area of electrode 14 is greater than the surface area of the end of rod 10. In one particular example, a spherical electrode having a diameter greater than the diameter of rod 10, produced very satisfactory results. Advantageously, the dielectric member 10, may be employed to increase the non-linearity of the field gradient. For example, the dielectric member may be of material having a uniform relative dielectric constant and be tapered in the direction of electrode 14 such that the member 10 in the region of electrode 12 has a much greater cross-sectional area than the end of member 10 which is connected to electrode 14. An equivalent result may be obtained if the member 10 is of uniform diameter but has a dielectric of graduated density or which comprises a material having a progressively different electrical conductivity or dielectric constant. In any of these arrangements, the dielectric constant, or alternatively the electrical conductivity, varies from a low value in the region of electrode 14 to a high value in the region of electrode 12.

The arcuate electrode 12 may be either a stitched wire surface or a solid conducting surface. In the case of stitched wire surface, the wires are very close together so that when an electrical potential is applied to these wires, they act substantially in the same manner as a conductive surface. Arcuate electrode 12 will produce a thrust when a potential is applied to the electrode 12 which is opposite in polarity to the potential of the bodies in the region of electrode 12. Such a thrust will be produced even though the dielectric member 10 and the electrode 14 are eliminated from the structure. However, the thrust produced by the charged arcuate electrode 12 when actuating alone is less than the thrust produced by the combined device, that is, employing the dielectric member 10 and the oppositely charged electrode 14.

Referring now to FIGURE 2, there is depicted another illustrative embodiment of this invention in which field-shaping is accomplished. In the embodiment of FIGURE 2, the planar electrode 18 is connected to a hemispherical electrode 14 by means of a dielectric rod 10. When a source of electrical potential (not shown) is connected through wires 15 and 17 to electrodes 18 and 14, respectively, a field gradient will be produced between electrodes 18 and 14, which field gradient varies in accordance with the graph represented by solid line 32 of FIGURE 3. In this particular embodiment, as well as in the embodiment of FIGURE 1, the non-linearity of the field gradient is further augmented by the use of a connecting rod 10 which is a dielectric with progressively different dielectric constant between electrodes 18 and 14. A similar result may be produced by the use of a rod 10 having electrical conductivity which varies progressively between electrodes 18 and 14.

Referring now to FIGURE 4 there is depicted still another illustrative embodiment of this invention in which a thrust is produced in response to the application of electrical potentials.

A frusto-conical surface 25 comprising a metal or having a metal surface to be used on an electrode is connected to a tapered member 27. The tapered member 27 is frusto-conical and is primarily of non-conductive material but contains granules of semi-conducting material, which granules are concentrated near the tip 28. Mounted on tip 28 is a half-wave radiator 29 which may be in the form of a disk. It is to be noted that the axis of member 27 coincides with the axis of member 25. When a source of potential is connected to electrodes 25 and 29, a thrust is produced in the direction of the arrow 31 regardless of the polarity of the applied voltage. However, a greater thrust is produced if the electrode 25 is positive with respect to electrode 29. Alternating current voltages may also be applied to electrodes 25 and 29 and the potential may either be superimposed upon or substituted for the direct current voltages. Preferably, the frequency of the applied A.C. voltage is such that the diameter of the disk 29 constitutes a half-wave length of the applied voltage.

Referring now to FIGURE 5 there is disclosed a tapered member 32 which is of non-conductive material and may contain particles of semi-conducting material in a manner similar to member 27. The semi-conducting material contained in member 32 and in member 27 may be any convenient form of massive particles such as lead oxide. Along one surface of member 32 is an electrode 34 while along the opposite surface is another electrode 36. When a potential is applied to these electrodes, preferably of a polarity such that electrode 36 is positive with respect to electrode 34, a thrust is produced in the direction of the arrow 37. In the devices disclosed in both of FIGURES 4 and 5, the thrust produced by the electrodes is augmented by the varying cross-sectional area of the non-conductive member connecting the electrodes and is further augmented by the voltage gradient produced by the embedded particles, which voltage gradient is greater than that which would be introduced by a tapered non-conductive member without embedded particles.

Referring now to FIGURE 6 there is depicted a bank of members 32 such as disclosed in FIGURE 5 in which like electrodes 36A through 36E are secured together by a connector in any convenient form, such as plate 38. Each of these members 32A through 32E produces a thrust in the direction of the arrow 37A and the resultant force is equal to the sum of the thrust produced by the individual members 32 in response to the application of potentials to the electrodes 34A–34E and 36.

In FIGURE 7 there is depicted a pair of banks of members, such as depicted in FIGURE 6, in which the electrodes are serially connected. In this particular instance, a plate or other member 40 comprises an electrode on which are mounted an array of members 32F through 32J. A second electrode 42 is secured between electrodes 32F through 32J and electrodes 32K through 32P. A third electrode 44 is connected to the electrode 34 on each of members 32K through 32P. It is to be noted that electrodes 40 and 44 are connected to a source of one potential while electrode 42 is connected to a source of the opposite potential. The thrust produced by this array is in the direction of arrow 37B and the manner in which this thrust is produced is similar to that explained in connection with FIGURES 5 and 6, although it would appear that electrode 42 will experience a mutual attraction for electrodes 40 and 44. A non-linear field gradient is produced between these electrodes by the varying cross-sectional area of members 32 and by the presence of semi-conducting particles in members 32. This non-linear field gradient gives rise to the thrust, as mentioned above.

Referring now to FIGURES 8A, 8B, and 8C there is depicted other illustrative embodiments of this invention. In FIGURE 8A a toroid member 48 has an electrode 50 supported at its center by means of insulating rods 52. If the electrode 50 and the toroid member 48 are both conducting surfaces defining electrodes and these electrodes are connected to sources of opposite potential, no thrust will be developed by the device. If, however, as depicted in FIGURE 8B electrode 50 is translated along the axis of generation of toroid or annular member 48 and again supported by non-conductive members 52, this device will experience a downward thrust, as indicated by arrow 53, in response to the application of potentials of either polarity. It is believed that this force is produced by the annular configuration of electrode 48 and the off central location of electrode 50. In the instance of FIGURE 8C, electrode 50 is positioned beneath the center of electrode 48 and positioned on the axis of generation of electrode 48. When potentials are applied to electrodes 48 and 50 in FIGURE 8C, a thrust is produced in an upward direction, as indicated by arrow 54. Here again the field gradient is produced by the configuration of electrode 48 and the location of electrode 50 with respect to electrode 48.

From the foregoing discussion, it is also apparent that a combination of a curved electrode, a supporting member of varying cross-sectional area, and a second electrode supported by the connecting member will produce a thrust along the axis of the curved electrode when potentials are applied to the electrodes. Similarly, a thrust may be developed between plane electrodes of unequal areas which are connected by a member of varying cross-sectional area. The thrust developed by this last mentioned device is further increased by the introduction of semi-conductive particles in the non-conducting member, which particles are more concentrated in the region of the smaller electrode than in the region of the larger electrode. Further, these tapered members having planar electrodes connected to opposite surfaces may be stacked in vertical arrays and connected in parallel, or they may be stacked in vertical arrays connected in series with similar vertical arrays.

In applying potentials to these various embodiments, it has been found that the rate at which the potential is applied often influences the thrust. This is especially true where dielectric members of high dielectric constant are used and the charging time is a factor. In such cases, the field gradient changes as the charge is built up. In such cases where initial charging currents are also high, dielectric materials of high magnetic permeability likewise exhibit varying thrust with time.

One advantageous manner of applying potential is that of employing potentials which vary cyclically.

It is thus apparent that one embodiment of this invention embodies a pair of electrodes mounted on an insulating member, one of which electrodes defines an arcuate surface to produce an improved thrust in response to the application of direct current potentials. It is also apparent that this thrust is augmented by increasing the non-linearity of the field gradient by a progressively-changing characteristic of the dielectric member connecting these electrodes. This non-linearity of field may be produced by a gradient in electric conductivity, electric permittivity and/or magnetic permeability along the length of the member, or it may result from a change in the cross-sectional area of the rod which rod has otherwise uniform characteristics.

While I have shown and described various embodiments of my invention, it is understood that the principles thereof may be extended to many and varied types of machines and apparatus. The invention therefore is not to be limited to the details illustrated and described herein.

I claim:

1. A device for producing thrust comprising a field shaping surface formed of stitched, closely spaced conductors and having a dielectric material therebetween to define a smooth surface, a dielectric member connected to said field shaping surface and an electrode on the end of said dielectric member remote from said field shaping surface, and means for applying electrical potential between said electrode and said closely spaced conductors.

2. A device for producing thrust in accordance with claim 1 wherein said dielectric member has a dielectric constant which varies progressively between said electrode and said surface means.

3. A device for producing thrust comprising an electrode having a relatively large surface area, an electrode positioned in the region of the axis of generation of said surface and having a relatively small surface area, dielectric means connecting said electrodes and means for applying a varying electrical potential to said electrodes.

4. A device in accordance with claim 3 wherein said dielectric means exhibits a dielectric constant which varies progressively from a relatively high value in the region of the large electrode to a relatively low value in the region of said small electrode.

5. A device in accordance with claim 3 wherein said dielectric means has an electrical conductivity which varies progressively between said electrodes.

6. A device for producing thrust comprising a planar electrode, a second electrode positioned in the region of the axis of generation of said planar electrode and having a surface area smaller than the surface area of said planar electrode, a dielectric member connecting said electrodes and means for applying a high electrostatic potential to said electrodes.

7. A device in accordance with claim 6 wherein said dielectric member is tapered from the planar electrode towards the smaller electrode.

8. A device in accordance with claim 6 wherein said dielectric member has a conductivity which varies progressively from a relatively high value near the planar electrode to a relatively low value near the smaller electrode.

9. A device for producing thrust in response to the application of electrical potentials to the electrodes thereof comprising a first electrode, a second electrode having a relatively large planar surface area with respect to said first electrode and means including a connecting member supporting said electrodes in spaced relationship for producing a varying field gradient between said electrodes.

10. A device in accordance with claim 9 wherein said connecting member has a varying cross-section.

11. A device in accordance with claim 9 wherein said connecting member tapers between said electrodes.

12. A device in accordance with claim 9 wherein said first and second electrodes are flat electrodes of unequal area.

13. A device according to claim 9 including means for applying a varying electrical potential to said electrodes.

14. A device in accordance with claim 9 wherein said connecting member has a dielectric constant which varies between electrodes.

15. A device in accordance with claim 14 wherein said first electrode is a frusto-conical surface and wherein said connecting member extends along the axis of generation of said first electrode.

16. A device in accordance with claim 14 wherein said first electrode defines a frusto-conical surface.

17. A device in accordance with claim 9 wherein said connecting member comprises semi-conducting particles whereby said connecting member is given a conductivity gradient.

18. A device in accordance with claim 15 wherein said second electrode is a disk-shaped radiator and wherein the potentials applied to said electrodes are alternating current potentials, the diameter of said disk-shaped electrode being equal to a half-wave length of the alternating current potential.

19. A device in accordance with claim 15 wherein said connecting member contains semi-conducting particles which are more concentrated in the region of the disk radiator than in the region adjacent said first electrode.

20. A device for producing thrust in response to the application of electrical potentials to the electrodes thereof comprising an annular electrode, a second electrode, and insulating means connecting said electrodes whereby thrust is produced along the axis of generation of said annular electrode in response to the application of electrical potentials thereto.

21. A device in accordance with claim 20 wherein said annular electrode comprises a torodial surface.

22. A device in accordance with claim 20 wherein said second electrode is mounted on the axis of generation of said annular electrode.

23. A device in accordance with claim 22 wherein said second electrode is displaced from the center of said annular electrode whereby a thrust is developed along said axis in a direction from said second electrode towards that annular electrode in response to the application of electrical potentials thereto.

References Cited by the Examiner

UNITED STATES PATENTS 1,974,483   9/34   Brown _____ 310—5

FOREIGN PATENTS 1,003,484   11/51   France.

MILTON O. HIRSHFIELD, *Primary Examiner.*

ORIS L. RADER, DAVID X. SLINEY, *Examiners.*